United States Patent
Hutchinson

(10) Patent No.: US 9,559,507 B2
(45) Date of Patent: Jan. 31, 2017

(54) MOUNTING BRACKET ASSEMBLY FOR AN ELECTRICAL CABLE

(71) Applicant: GE Aviation Systems LLC, Grand Rapids, MI (US)

(72) Inventor: Ricky Neil Hutchinson, Cincinnati, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 165 days.

(21) Appl. No.: 13/670,700

(22) Filed: Nov. 7, 2012

(65) Prior Publication Data

US 2014/0126173 A1 May 8, 2014

(51) Int. Cl.

| | |
|---|---|
| *H01R 4/18* | (2006.01) |
| *H02G 3/34* | (2006.01) |
| *H01R 9/05* | (2006.01) |
| *H01R 13/58* | (2006.01) |
| *H01R 13/516* | (2006.01) |
| *H01R 13/6592* | (2011.01) |
| *H02G 15/007* | (2006.01) |
| *G02B 6/38* | (2006.01) |
| *H02G 3/06* | (2006.01) |

(52) U.S. Cl.
CPC ............ *H02G 3/34* (2013.01); *G02B 6/3887* (2013.01); *H01R 9/0518* (2013.01); *H01R 13/516* (2013.01); *H01R 13/58* (2013.01); *H01R 13/5808* (2013.01); *H01R 13/6592* (2013.01); *H02G 3/0616* (2013.01); *H02G 15/007* (2013.01)

(58) Field of Classification Search
CPC ..... H01R 9/032; H01R 9/0518; H01R 13/516; H01R 13/58; H01R 13/5808; H01R 13/6592; H01R 9/0524; H02G 15/007; H02G 3/34; H02G 3/0616; F16L 3/2235; G02B 6/3887
USPC ........ 174/84 C, 140 R, 140 S, 366; 361/825, 361/826, 827; 439/607.23
See application file for complete search history.

(56) References Cited

U.S. PATENT DOCUMENTS

| | | | | |
|---|---|---|---|---|
| 5,713,748 | A | * | 2/1998 | Mulvihill ..................... 439/98 |
| 6,007,383 | A | | 12/1999 | Cabes |
| 6,497,589 | B1 | | 12/2002 | Hutchinson et al. |
| 6,700,065 | B2 | * | 3/2004 | Karlsson .................. 174/74 R |
| 8,460,015 | B2 | | 6/2013 | Deno et al. |
| 2004/0099428 | A1 | | 5/2004 | Miyazaki |

(Continued)

FOREIGN PATENT DOCUMENTS

| | | |
|---|---|---|
| CN | 102422490 | 4/2012 |
| DE | 3242073 A1 | 5/1984 |

(Continued)

OTHER PUBLICATIONS

GB Combined Search and Examination Report issued May 9, 2014 in connection with corresponding GB Patent Application No. GB1319583.9.

(Continued)

*Primary Examiner* — James Wu
(74) *Attorney, Agent, or Firm* — GE Global Patent Operation; William S. Munnerlyn

(57) ABSTRACT

A mounting bracket assembly for an electrical cable having a Faraday shield configured to allow at least one conductor passing through the assembly to a fire detector wherein the Faraday shield electrically terminates into the receiving end of the assembly without the need for additional electrical connections.

4 Claims, 3 Drawing Sheets

(56) References Cited

U.S. PATENT DOCUMENTS

2010/0000788 A1    1/2010  Kawase et al.
2010/0300749 A1   12/2010  Adachi et al.

FOREIGN PATENT DOCUMENTS

| DE | 102011087762 A1 | 6/2013 | |
|---|---|---|---|
| EP | 2360803 A2 | 8/2011 | |
| FR | 2768563 A1 | 3/1999 | |
| GB | 2380333 A | 4/2003 | |
| WO | WO 9914826 A1 * | 3/1999 | ............ H01R 13/74 |
| WO | 2013172178 A1 | 11/2013 | |

OTHER PUBLICATIONS

Unofficial translation of CN Office Action issued on Oct. 20, 2016 in connection with corresponding CN Application 201310545739.6.

* cited by examiner

MOUNTING BRACKET ASSEMBLY FOR AN ELECTRICAL CABLE

BACKGROUND OF THE INVENTION

Electrical cables with an electrical conductor may have a Faraday shield surrounding the conductor when it is desired to protect the conductor from external electrical fields, such as a lightning strike. The Faraday shield may be connected to a ground. In an aircraft engine environment, the Faraday shield is typically grounded by separating the shield from the conductor and affixing the separated portion of the shield to a ground, such as a bolt or nut of the engine structure, which may be part of a ground circuit.

BRIEF DESCRIPTION OF THE INVENTION

A mounting bracket assembly for an electrical cable having a Faraday shield surrounding at least one conductor through which electricity may be supplied to an electricity-consuming apparatus, the mounting bracket assembly comprising a base configured to mount to a portion of the electricity-consuming apparatus, a strain relief element fixing a portion of the electrical cable relative to the base, a shield support telescopically coupling with the Faraday shield when the portion of the electrical cable is fixed by the strain relief element, and an electrical ground path extending from the shield support to the base. When the cable is fixed by the strain relief element, the support shield is received within the Faraday shield to establish an electrical grounding of the Faraday shield to the electricity-consuming apparatus via the ground path.

DESCRIPTION OF EMBODIMENTS OF THE INVENTION

Figure 1:
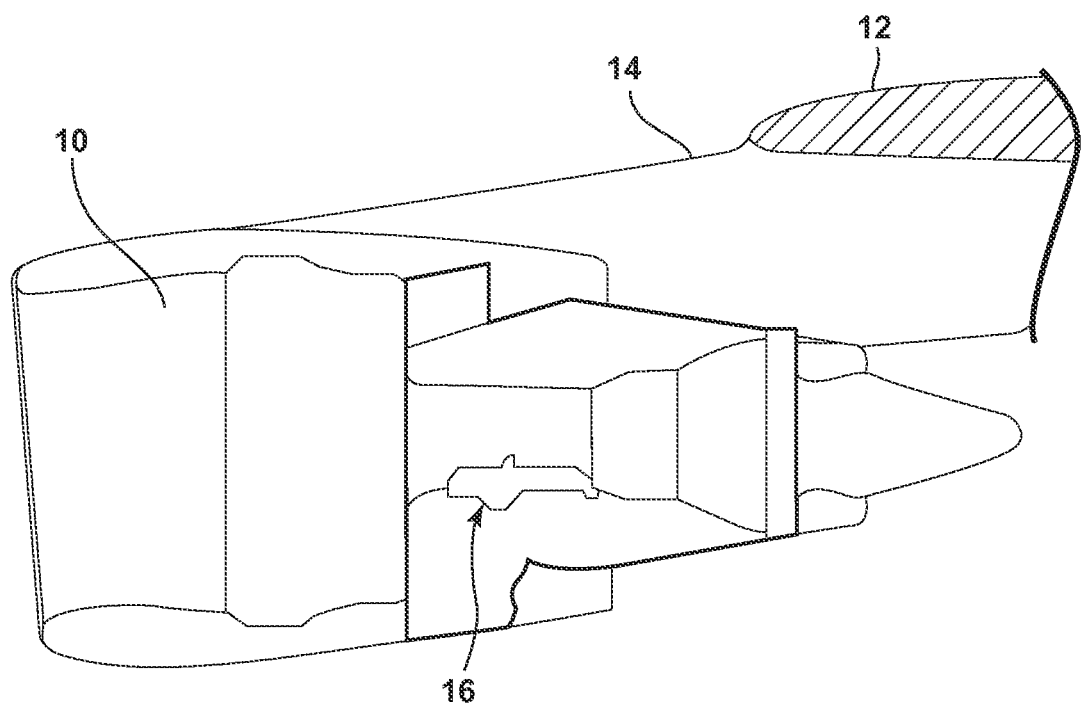
FIG. 1 is a schematic view of an aircraft engine attached to an aircraft, including an electricity use component supplied electricity by an electrical connection incorporating a mounting bracket assembly according to the invention.

While the invention and its embodiments may be used in any environment, the contemplated environment is that of a jet engine. Thus, an initial explanation of the relevant portion of a jet engine environment should prove useful is setting the environment for one implementation of the invention. FIG. 1 schematically illustrates a jet engine 10 secured by a pylon 14 to an aircraft wing 12. The jet engine 10 has many different components 16 that use an electrical cable for using, supplying or receiving, electricity.

Figure 2:
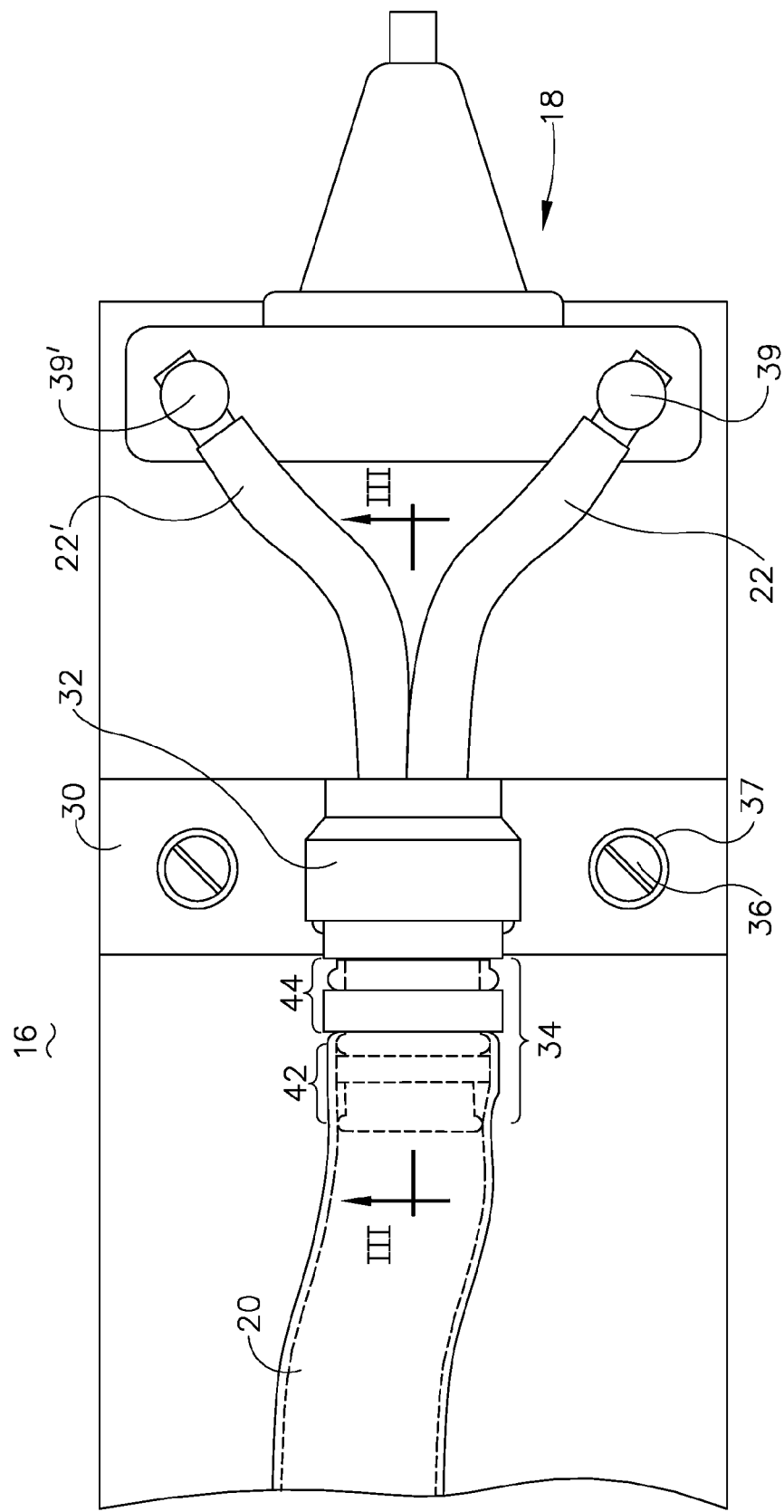
FIG. 2 is a schematic view of the electrical component of FIG. 1, in the form of a fire detector, with the mounting bracket assembly securing the electrical cable.

Referring to FIG. 2, for purposes of this description, a fire detector 18 is selected as an illustrative component 16, which is supplied electricity by an electrical connection. Additional examples of engine components include, but are not limited to, sensors, relays, electrical buses, computers, compressors, turbines, and other standard or special components.

The fire detector 18 is supplied electricity by an electrical connector cable 20, which is secured by a mounting bracket assembly 24 to the jet engine 10. The electrical connector cable 20 comprises at least one electrical conductor 22, which, as illustrated, is shown having paired conductors 22, 22'. The conductors 22, 22' may be any electrical conductor, enclosed in any non-conducting material, and configured to transmit power, electrical ground, an analogue signal, or a digital signal. Although the figure shows two conductors 22, 22', fewer or more conductors may be used.

As illustrated, the mounting bracket assembly 24 performs several functions: strain relief for the cable 20, electrical grounding, and physical support for the cable 20. A strain relief element, which is generally illustrated as a clamp, and specifically as a deformable portion 32 is provided to constrain and hold a portion of the cable 20.

A base 30 mounts the deformable portion 32 to the jet engine to fix the position of the cable 20 to the jet engine when clamped. A fastening component is provided to aid in the mounting of the base 30 to the portion of the fire detector 18. As illustrated, the fastening component comprises a fastener 36 received through an opening 37 in the base 30. Any suitable fastening component may be used. For example, other mechanical fasteners, e.g. bolts, nails, pins, etc., may be used as well as non-mechanical fasteners, such as welding or adhesive. Alternatively, the base 30 may be formed simultaneously and conjoined with at least a portion of the fire detector 18.

The base 30 may be formed from a conductive material, and is electrically connected to the fire detector 18, which is electrically grounded to at least one of the aircraft or jet engine. Similarly, the deformable portion 32 is formed from a conductive material, and is electrically connected through the base 30 to electrical ground.

Figure 3:
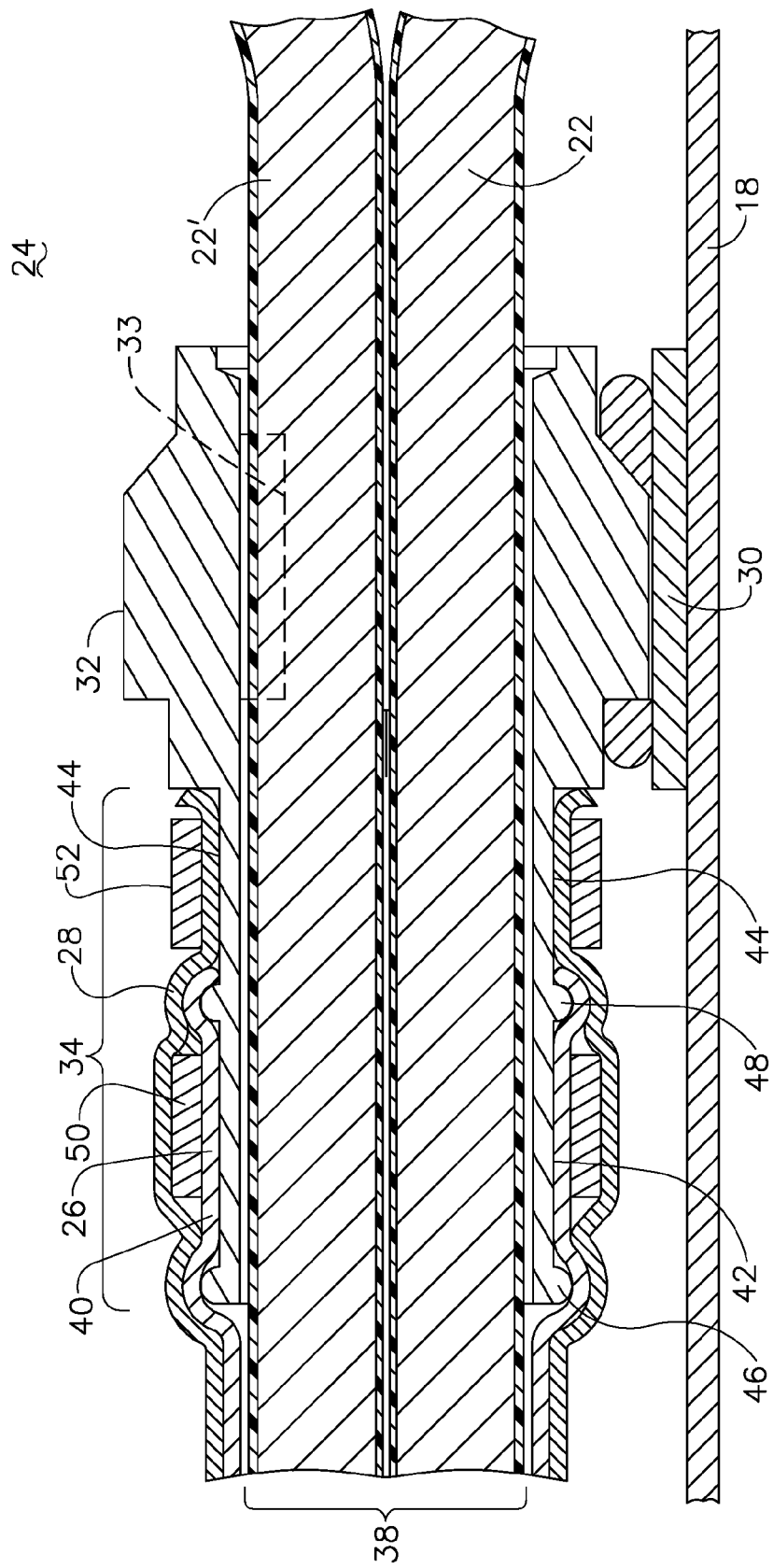
FIG. 3 is a partial sectional view taken along line 3-3 of FIG. 2 showing the Faraday shield termination at the mounting bracket assembly.

Turning now to FIG. 3, as illustrated, the deformable portion 32 defines a passageway 38 through which the at least one conductor 22, 22' passes. While shown as a ring, which defines the passageway 38, the deformable portion may have any suitable shape. For example, the deformable portion can be of a shape that only partially bounds the passageway 38, such as a C-shaped cross section, which may aid in the insertion of the cable into the passageway 38.

FIG. 3 illustrates the deformable portion 32 prior to deformation. When deformation occurs in the deformable portion 32, the section view in this portion would compress around the conductors 22, 22', creating an area of deformation 33, illustrated by the dotted line. The deformable portion 32 may be attached to the base 30 by any suitable manner, such as by welding. Alternatively, the deformable portion 32 may be integrally formed with the base 30 to create a single unit.

The deformable portion 32 and the base 30 cooperate to constrain the cable 20 relative to the fire detector 18 in that the deformable portion 32 fixes a portion of the cable 20, such as the conductors 22, 22', and the base fixes the deformable portion to at least one of the aircraft and jet engine. The strain relief prevents the electrical conductors 22, 22' from disconnecting from the corresponding terminal 39, 39' due to strain on the connector cable 20. The deformable portion 32 may be configured to deform in a variety of different ways, such as being crimpable.

FIG. 3 further illustrates the details of the electrical connector cable 20, where the conductors 22, 22' are enveloped by a Faraday shield 26 for electrical interference protection. The Faraday shield 26 is further enveloped by an external durable cable protector 28 which envelopes both the Faraday shield 26 and the electrical conductor 22, 22'.

The Faraday shield 26 may be comprised of a conducting material or a mesh, textile, or grouping of such material and configured to protect the conductor 22, 22' from external electricity charges, static electrical field interference, and magnetic field interference. In the jet engine environment, the Faraday shield 26 protects the conductors 22, 22' from lightning strikes. The durable cable protector is a braided non-conducting mesh 28, but may alternatively be comprised of molded, wrapped, or coiled conducting or non-conducting material, configured to reliably withstand the vibration and fatigue found within a jet engine 10. Although specific examples of the shield 26 and braided mesh protector 28 are described or embodied, it will be understood that many different embodiments exist and may be applied for either component.

FIG. 3 further illustrates additional details of the mounting bracket assembly 24, which are used to support and manage the different elements of the electrical connector cable 20. For example, a shield support is provided to support the Faraday shield 26. While the shield support may be any suitable structure that supports the Faraday shield 26, it is illustrated as a collar 34 that extends from the deformable portion 32. The collar 34 is sized to telescopically couple with the Faraday shield 26. The collar 34 defines an inner opening 38 and outer surface 40. First and second ribs 46, 48 are axially spaced on the collar to divide the outer surface 40 of the collar 34 into first and second conductive surfaces 42, 44, about which first and second clamps 50, 52 are provided.

To assemble the cable 20 to the mounting bracket 24, the Faraday shield 26 is positioned in telescoping direct contact with the conductive outer surface 42 of the collar 34, creating a conductive junction. The Faraday shield clamp 50 provides for a secured coupling between the Faraday shield 26 and the conductive surface 42 of the collar 34. The Faraday shield 26 is coupled such that when secured by the Faraday shield clamp 50 no excessive strain is placed on the cable 20 in the 3-dimensional directions towards or away from the deformable portion 32.

The cable protector 28 is positioned in telescoping direct contact with the conductive surface 44 of the collar 34, creating a junction. The second ring clamp 52 provides for a secured coupling between cable protector 28 and the conductive surface 44 of the collar 34. The cable protector 28 of the electrical connector cable 20 is coupled such that when secured by the second ring clamp 52 no excessive strain is placed on the cable 20 in the 3-dimensional directions towards or away from the deformable portion 32.

The clamp bands 50, 52 in combination with their corresponding ribs 46, 48 function to prevent telescopic removal of either the Faraday shield 26 or cable protector 28 from the collar 34. Although a clamp 50, 52 is described, any fastening device or technique to prevent removal of either the Faraday shield 26 or cable protector 28 layers from the collar 34 is envisioned.

The coupling of the Faraday shield 26 to the collar 34 creates an electrical ground path extending from the shield 26 through the base 30 to at least one of the aircraft and jet engine, such that when the cable 20 is fixed by the deformable portion 32, the cable 20 is shielded from electrical or magnetic interference by the common ground between the Faraday shield 26 and the fire detector 18. The grounding path may extend from the Faraday shield 26 to the collar 34, the collar 34 to the deformable portion 32, and the deformable portion 32 to the grounded base 30. Other alternative grounding paths may be established between the Faraday shield 26 and the mounting bracket assembly 24.

The current mounting bracket assembly 24 limits device failures and minimize service costs to alleviate the impact of unforeseen maintenance disruptions of Faraday shield grounding. It would be beneficial to increase the reliability of such electrical connections in an efficient manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting bracket assembly for an electrical cable, comprising:
   a base configured to mount to a portion of an electricity-consuming apparatus;
   a strain relief element including a crimp that fixes a portion of the electrical cable relative to the base;
   a collar that extends from the crimp, wherein the crimp telescopically couples with a Faraday shield included in the electrical cable, and the collar has an inner opening that enables passage of at least one conductor included in the electric cable, wherein the Faraday shield surrounds the at least one conductor, and a non-conducting cable protector included in the electrical cable surrounds the collar;
   a first rib and a second rib axially spaced on the outer surface of the collar, wherein the second rib is positioned closer to the crimp than the first rib, and the collar is configured to have a first ring clamp, positioned between the Faraday shield and the non-conducting cable protector, to clamp the Faraday shield to the collar between the first rib and the second rib, and a second ring clamp, positioned between the second rib and the crimp, to secure the non-conducting cable protector; and
   an electrical ground path extending from the collar to the base such that when the cable is fixed by the strain relief element, the collar is received within the Faraday shield to establish an electrical grounding of the Faraday shield to the electricity-consuming apparatus via the electrical ground path.

2. The mounting bracket assembly of claim 1, wherein the rib extends radially a distance greater than at least a portion of the radius of the Faraday shield when the clamp is clamping the Faraday shield to the collar.

3. The mounting bracket assembly of claim 1, wherein the crimp includes a deformable portion that when deformation occurs compresses around the at least one conductor.

4. The mounting bracket assembly of claim 1, further comprising a fastening component provided on the base that aides in mounting the base to the portion of the electricity-consuming apparatus.

* * * * *